C. L. TOMLINSON.
WHEEL.
APPLICATION FILED MAR. 27, 1908.
926,626.
Patented June 29, 1909.
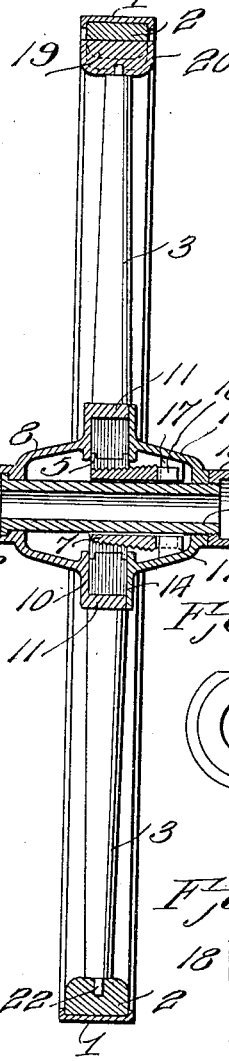
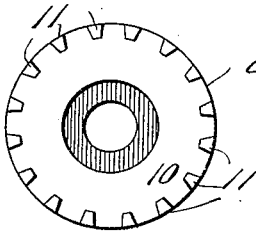
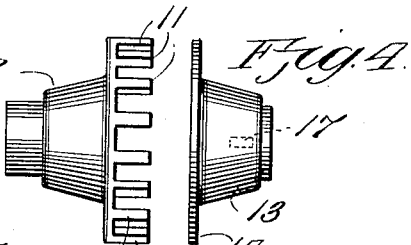
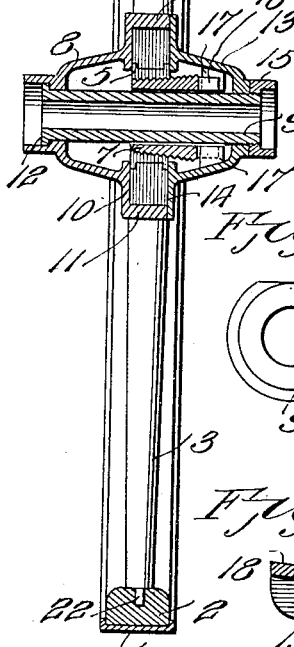
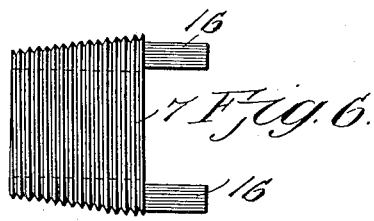
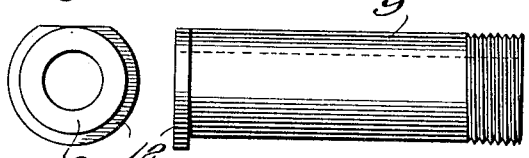
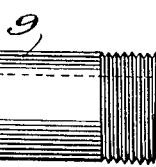
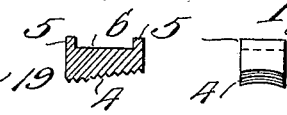
Inventor
Clarence L. Tomlinson,
Witnesses
Frank Hough.
P. M. Smith.
By Victor J. Evans
Attorney.

UNITED STATES PATENT OFFICE.

CLARENCE L. TOMLINSON, OF PORTLAND, OREGON.

WHEEL.

No. 926,626.　　　　Specification of Letters Patent.　　Patented June 29, 1909.

Application filed March 27, 1908.　Serial No. 423,779.

*To all whom it may concern:*

Be it known that I, CLARENCE L. TOMLINSON, a citizen of the United States, residing at Portland, in the county of Multnomah and State of Oregon, have invented new and useful Improvements in Wheels, of which the following is a specification.

This invention relates to wheels, the object in view being to provide means whereby a tire may be tightened without heating and whereby the spokes may also be tightened or removed and replaced in an easy and practical manner.

With the above and other objects in view, the nature of which will more fully appear as the description proceeds, the invention consists in the novel construction, combination and arrangement of parts as herein fully described, illustrated and claimed.

In the accompanying drawing:—Figure 1 is a diametrical section through a wheel illustrating the novel construction contemplated in this invention. Fig. 2 is an inside face view of one of the hub sections. Figs. 3 and 4 are respectively plan views of the spoke receiving and spoke clamping sections. Fig. 5 is an end view of the threaded expanding cone looking toward the smaller end thereof. Fig. 6 is a plan view of said cone. Fig. 7 is an end view of the axle box. Fig. 8 is a plan view thereof. Fig. 9 is a longitudinal section through one of the gibs. Fig. 10 is an end view of the same. Fig. 11 is a sectional view of one of the threaded shoes. Fig. 12 is an end view thereof.

Referring to the drawings, 1 designates the tire of a wheel, 2 the felly thereof which is made up of sections in the ordinary manner and 3 the spokes of the wheel.

In carrying out the present invention, each spoke is provided at its inner end with a threaded spoke butt one of which is illustrated in detail in Figs. 11 and 12 wherein it will be seen that said butt comprises an inclined and threaded surface 4 and flanges 5 extending outward from the opposite side thereof thereby leaving a seat 6 for the reception of the correspondingly reduced inner end of the spoke, as seen in Fig. 1. Each spoke is provided with one of the threaded spoke shoes shown in Figs. 11 and 12 and all of the spoke shoes are simultaneously engaged by a threaded expanding cone 7 which is shown in detail in Figs. 5 and 6, the taper of the cone corresponding with the inclination of the threaded surface 4 of the spoke shoes so that as the expanding cone is screwed inward, the spokes are forced outward by reason of the threaded engagement of the cone with the spoke shoes as readily seen in Fig. 1.

The hub comprises a socket or receiving section 8 which fits upon the axle box 9, the latter extending through the expanding cone 7 and forming a bearing therefor. The hub section 8 is provided with an enlarged disk-shaped portion 10 from which extend lateral tongues 11 between which the inner ends of the spokes are received in the manner indicated in Fig. 1. The hub section 8 has its outer end recessed and internally shouldered as shown in Fig. 1 while the axle box 9 is provided at the corresponding end with an enlarged head or flange 12 which fits within the recessed outer end of the hub section 8 and bears against the internal annular shoulder therein. The other hub section 13 is provided with a disk-shaped portion 14 adapted to bear against the enlarged butt ends of the spokes, as shown in Fig. 1 and clamp said spokes against the disk-shaped portion of the hub section 8, the hub section 13 being held in place by a clamping nut 15 which is screwed upon the threaded end of the axle box 9 as shown in Fig. 1.

The expanding cone 7 is provided at diametrically opposite points with outwardly extending lugs 16 while the hub section 13 is provided with inwardly extending lugs 17, the said lugs of the cone 7 and hub section 13 forming coöperating shoulders whereby when the hub section 13 is revolved, a corresponding movement is imparted to the expanding cone 7. This provides means for turning the cone and obtaining the expanding action thereof upon the shoes of the spokes, enabling the spokes to be tightened and also enabling the felly sections to be forced outward in firm contact with the inner surface of the tire 1.

In connection with one or more of the points between the felly sections, I provide gibs, shown in detail in Figs. 9 and 10, and each gib comprises a curved base 18, an outwardly projecting wedge portion 19 and side flanges 20. In addition to this the gib comprises a mortise 21 adapted to receive a corresponding tenon 22 on the outer end of the spoke, whereby the gib is carried by the spoke and caused to move outward thereby and force its way between the adjacent ends of adjoining felly sections. In this way, the felly sections are spread apart to take up any looseness and compensate for any shrinkage therein. This enables all parts of the wheel to be tightened thereby preventing all looseness and rattling in the wheel as a whole. At the same time any spoke or number of spokes may be removed and replaced without removing the tire and felly sections.

I claim:—

1. A wheel comprising an axle box shouldered at one end and threaded at the other end, a hub consisting of two hollow sections embracing the axle box, one section bearing against the shouldered end of the box, a nut on the box for pressing the sections toward one another, a rim, spokes entering sockets in the hub, a metal shoe at the inner end of each spoke provided with an inclined threaded inner face, a threaded expanding cone which engages all of said shoes and forces the same outward, lugs projecting outward from one end of the expanding cone and formed integrally with the latter, and lugs extending inward from one of the hub sections and coöperating with the cone lugs, substantially as described.

2. A wheel comprising an axle box, hub sections mounted upon the axle box, one of said sections being relatively fixed and provided with spoke sockets and the other hub section being rotatable and having inwardly extending lugs, spokes mounted in the spoke sockets and having a limited radial movement, individual shoes fitted to the inner ends of the several spokes and prevented from longitudinal and lateral movement and having their inner faces inclined and formed with corresponding screw threads, and an expanding cone slidably mounted upon the box and having screw threads matching and engaging the screw threads of the several individual shoes and provided with lugs projected laterally beyond the larger end thereof to be engaged by and to coöperate with the lugs of the rotatable section.

In testimony whereof I affix my signature in presence of two witnesses.

CLARENCE L. TOMLINSON.

Witnesses:
 HARRY H. COBB,
 VEVA C. CONKLIN.